(12) United States Patent
Yao

(10) Patent No.: US 6,628,862 B1
(45) Date of Patent: Sep. 30, 2003

(54) THERMAL-INDUCED WAVEGUIDE GRATINGS

(75) Inventor: X. Steve Yao, Diamond Bar, CA (US)

(73) Assignee: General Photonics Corporation, Chino, CA (US)

( * ) Notice: Subject to any disclaimer, the term of this patent is extended or adjusted under 35 U.S.C. 154(b) by 0 days.

(21) Appl. No.: 09/683,796

(22) Filed: Feb. 15, 2002

Related U.S. Application Data

(60) Provisional application No. 60/269,600, filed on Feb. 15, 2001.

(51) Int. Cl.[7] .................................................. G02B 6/34

(52) U.S. Cl. .................................. 385/37; 385/1; 385/2; 385/4

(58) Field of Search ................................ 385/37, 1, 2, 4

(56) References Cited

U.S. PATENT DOCUMENTS 6,285,812 B1 * 9/2001 Amundson et al. ........... 385/37
6,370,300 B1 * 4/2002 Eggleton et al. .............. 385/37

* cited by examiner

*Primary Examiner*—Hung N. Hgo
(74) *Attorney, Agent, or Firm*—Fish & Richardson P.C.

(57) ABSTRACT

Techniques and devices for forming a controllable thermal grating in an optical waveguide.

8 Claims, 1 Drawing Sheet

THERMAL-INDUCED WAVEGUIDE GRATINGS

CROSS REFERENCE TO RELATED APPLICATIONS

This application claims the benefit of U.S. Provisional Application No. 60/269,600 filed Feb. 15, 2001, the disclosure of which is incorporated herein by reference in its entirety.

BACKGROUND OF INVENTION

This application relates to gratings in optical waveguides such as optical fibers and other light-channeling devices.

Optical waveguides include optical fibers, dielectric slab waveguide formed on a substrate, or other light-channeling devices. Such a waveguide may be used to transport light from one location to another in an optical network, within an integrated optical device, or in other settings. A waveguide may be formed by a dielectric channel that is surrounded by one or more dielectric materials with indices of refraction less than that of the dielectric channel.

For example, a typical fiber may include a fiber core, a cladding layer surrounding the fiber core, and possibly other protection layers outside the cladding layer. The refractive index of the fiber core is higher than that of the fiber cladding. Light rays, when coupled into the fiber core within a maximum angle with respect to the axis of the fiber core, can be totally reflected at the core-cladding interface and thus are spatially confined within the fiber core.

DETAILED DESCRIPTION

The techniques and devices of the present disclosure are in part based on the recognition that, the guided optical energy in fibers or other waveguides is not completely confined within the physical boundary of the fiber core. Instead, the spatial distribution optical field of a guided optical signal extends outside the fiber core via an evanescent field that essentially decays as an exponential function of the distance from the core-cladding interface. This evanescent field, therefore, may be manipulated to control the guided optical signal in the fiber core.

More specifically, optical gratings may be induced at least in the fiber cladding by a controlled heating element engaged to the fiber. This is because the refractive index in some optical materials may be sensitive to temperature and hence can be controlled and varied or adjusted by controlling and varying the temperature. In fused silica, for example, the temperature coefficient of the refractive index is on the order of $10^{-6}/°$ C. Thus, for a temperature change of $100°$ C., the corresponding change in the refractive index is about $10^{-4}$. This magnitude of change in the refractive index can be sufficient to form an index variation for a fiber grating. Therefore, it is feasible to induce an index grating in an optical fiber with a thermal grating.

Figure 1:
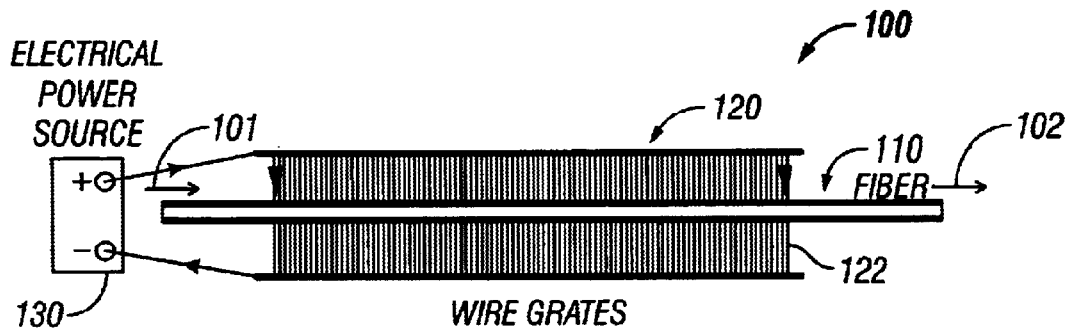
FIG. 1 shows an optical fiber grating device with a controllable electrically heated wire grating according to one embodiment of the disclosure.

FIG. 1 shows an optical fiber grating device 100 according to one embodiment of the present disclosure. The device 100 includes an optical fiber 110 which has a fiber core and a fiber cladding. An electrical wire grate 120 is coupled to the fiber 110 by contacting the fiber cladding to produce a periodic thermal grating. The wire grate 120 includes electrical resistive wires 122 that are arranged in parallel with one another in an array along the fiber 110 and are spaced by either a constant spacing or a chirped spacing. The wires 122 are electrically coupled to receive currents to generate heat. One way for making the resistive grate 120 is to chemically etch a sheet of metal such as a Tungsten sheet or a circuit board to form the wires 122. A grating control unit 130 is implemented to include an electrical power source (e.g., a current source) to provide the currents to the wires 122. When a current is applied to flow from one side of the grate to the other side, heat will be generated in each wire due to the resistive power dissipation. The dissipated power is given by: $P=IV=I^2 R=V^2/R$, where I is the current, V is the applied voltage and R is the resistance of each resistive wire. The contact of the fiber 110 and the wires 122 allows for transfer of the temperature variation from the grate 120 into the index variation along the fiber 110 and hence induces an index grating inside the fiber 110.

The wires 122 may be arranged to have a spatial periodic pattern along the fiber 110 so that the grating period at one location of the fiber 110 satisfies the local Bragg condition to couple optical energy at a selected wavelength from one optical mode to another optical mode supported by the fiber 110. Such optical modes include one or more core modes that are confined in the fiber core and cladding modes supported by the fiber cladding. For example, the grating may couple energy between two counter-propagating modes in the fiber core, between a core mode in the core and a cladding mode in the cladding, between two different transverse modes, or between two different polarization modes when the fiber 110 is birefringent. The device 100 modulates an input signal 101 to produce a modulated output signal 102 by coupling energy at the selected wavelength either out of the signal 110 or into the signal 101 based on one of above mode coupling schemes. Light at other wavelengths does not "see" the grating since the Bragg condition is not satisfied and hence propagates through the fiber 110 without being modulated. Therefore, in this context, the device 100 is wavelength selective.

The fiber grating device 100 is dynamic in a number of ways. First, the grating control unit 130 operates to either turn on the thermal grating so the device 100 filters or modulates the optical signal guided in the fiber 110 or turn off the thermal grating so the device 100 transmits the guided signal without optical filtering or modulation. Secondly, The grating control unit 130 can vary the current I in the resistive grate 120 to change the temperature variation. Therefore, the strength of the induced grating in the fiber 110 can be adjusted. Thirdly, the wire grate 120 may be adjustably engaged to the fiber 110 so that its orientation with respect to the fiber 110 can be adjusted. Assume a wire 122 forms an angle θ with respect the fiber 110, the induced grating in the fiber 110 is d/cos θ, where d is the spacing between two adjacent wire at one location of the wire grate 120. Hence, the relative orientation between the fiber 110 and the resistive grate 120 can effectively change the grating period in the fiber 110 so that the grating is a wavelength-tunable to selectively interact with different wavelengths at different angels.

Figure 2:
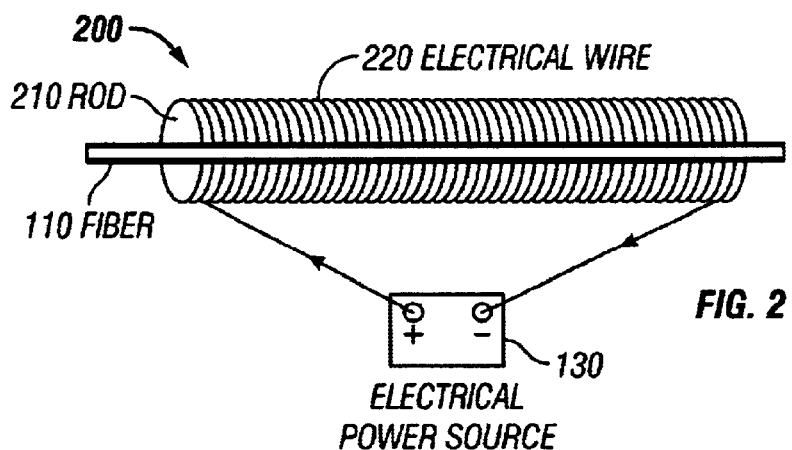
FIG. 2 shows an optical fiber grating device with an electrically-heated wire grating formed on an insulating rod according to another embodiment.
Figure 2A:
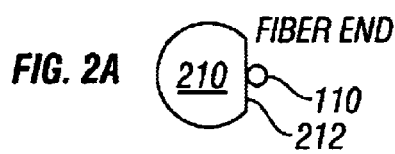
FIGS. 2A and 2B show cross-sectional views of two different exemplary configurations of the insulating rod for engaging the fiber in the device in FIG. 2.
Figure 2B:
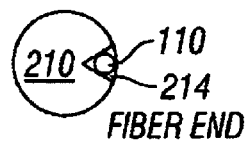

FIG. 2 shows another optical fiber grating device 200. An electrically-insulating member 210, such as a rod, may be used to wind an electrical resistive wire 220, e.g., a Tungsten wire, to form a period pattern with a constant or chirped spacing. In FIG. 2A, the rod 210 is shown to have a flat surface 212 to provide a contact surface with the fiber 110. In this configuration, the relative orientation of the rod 210 and the fiber 110 may be adjusted to change the wavelength that satisfies the Bragg condition. FIG. 2B shows another implementation where the rod 110 is fabricated to have a groove 214 for receiving the fiber 110. The wire 220 may be wound around the rod 210 either before or after the fiber 110 is place in the groove 214.

Figure 3:
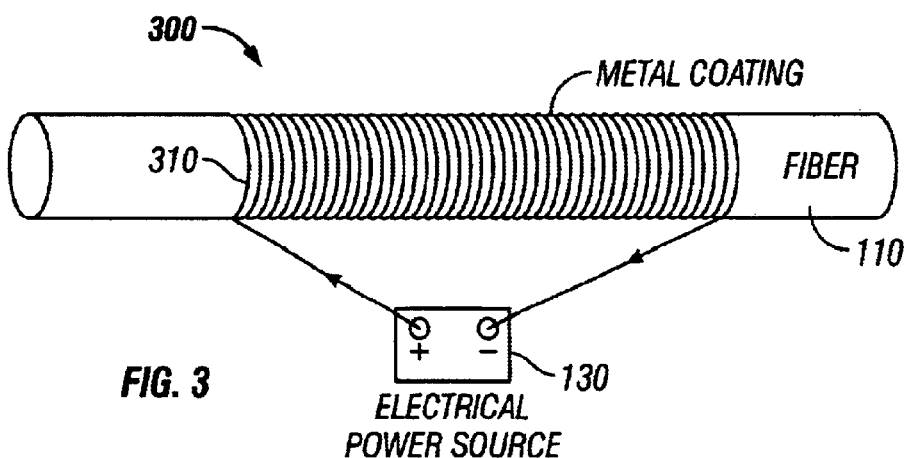
FIG. 3 shows an optical fiber grating device with a metal wire grating directly deposited onto the optical fiber.

FIG. 3 shows yet another embodiment of a fiber grating device 300 based on the thermal-induced grating mechanism. An electrically-conductive grating wires 310 formed of a metallic material or other conductive material (e.g., a conductive dielectric material TiO) may be directly formed on the outer surface of the fiber 110. In fabrication, a conductive layer may be first formed over the outer surface of the fiber 110. Next, the layer is patterned to form the connected grating wires 310 by, e.g., using a laser beam to selectively remove parts of the layer or using an etching process to perform the removal. The advantage of this method is the high power efficiency and low power consumption.

It is also contemplated that two or more such thermal gratings for coupling light at different wavelengths may be formed at different locations in a single fiber to interact with spectral components at different wavelengths. Furthermore, such a thermal grating mechanism may also be implemented in a planar waveguide formed on a substrate or other light-channeling devices.

Although the present disclosure only includes a few embodiments, it is understood that various modifications and enhancements may be made without departing from the following claims.

What is claimed is:

1. A device, comprising:

a fiber;

a thermal heating element having a wire grate having a plurality of conductive wires arranged in parallel to form a wire array in a plane and coupled to said fiber to contact said conductive wires with said fiber; and a control unit coupled to said thermal heating element and operable to supply to each wire a current to heat said fiber so as to cause a thermal-induced index grating in said fiber.

2. The device as in claim 1, wherein said wire grate is adjustably in contact with said fiber to change the orientation of said wires relative to said fiber to change a grating period of said thermal-induced index grating.

3. A device, comprising:

a fiber; and a thermal heating element having a plurality of conductive wires arranged to form a wire array and each wire operable to receive an electric current to produce heat, said conductive wires in contact with said fiber and operable to cause a thermal-induced index grating in said fiber, wherein said thermal heating element is adjustably engaged to said fiber and is operable change a relative orientation of said conductive wires with respect to said fiber to change a grating period of said thermal-induced index grating.

4. A method, comprising:

causing an electrically conductive grating pattern to contact an outer surface of a fiber, wherein an orientation of said electrically conductive grating pattern is adjustable with respect to said fiber;

causing a current to run through said an electrically conductive grating pattern to heat up said fiber to induce a thermal grating in said fiber; and causing said orientation of said electrically conductive grating pattern to be adjusted to change a grating period of said thermal grating in said fiber.

5. The method as in claim 4, further comprising causing the current to be varied to adjust a strength of said thermal grating.

6. A device, comprising:

a rod;

a conductive wire winding around said rod to form a grating pattern with portions of said wire on a side surface of said rod;

a current supply unit coupled to supply and control an electric current to said wire to cause heat; and a fiber in parallel with said rod and engaged to contact said grating pattern and operable to produce a thermal-induced index grating when said current is on.

7. The device as in claim 6, wherein said side surface is a flat surface.

8. The device as in claim 6, wherein said side surface includes an elongated groove in parallel within which said fiber is located to be in contact with said grating pattern.

* * * * *